UNITED STATES PATENT OFFICE.

JAMES HENDERSON, OF BELLEFONTE, PENNSYLVANIA, ASSIGNOR TO CHARLES G. FRANCKLYN, OF NEW YORK, N. Y.

COMPOUND FOR FURNACE-LININGS AND FIRE-BRICK.

SPECIFICATION forming part of Letters Patent No. 265,069, dated September 26, 1882.

Application filed September 1, 1882. (No specimens.)

*To all whom it may concern:*

Be it known that I, JAMES HENDERSON, of Bellefonte, Centre county, Pennsylvania, (formerly of New York,) have invented a new and useful Improvement in Compounds for Furnace-Linings and Fire-Brick, of which the following is such full, clear, and exact description as will enable those skilled in the art to make and use the same.

The object of this invention is the making of a compound for furnace-linings and fire-brick for furnaces, converters, and other metallurgic vessels of oxide of iron in a pulverized or powdered condition with lime or magnesian lime in a small proportion and water, so as to bind or hold the oxide of iron together into a mass.

In carrying out my invention I prefer to use the pure iron sands of Long Island, New York State, and that are found on the sea-shore of some other places, or the purer kinds of iron ores from Lake Superior or Lake Champlain, or some oxide of iron practically free from impurities. The oxide of iron is reduced to a fine sand, or preferably ground to a fine flour, so as to pass through a sieve having about three thousand six hundred meshes to the square inch. I also use by preference a lime made from the dolomite quarried near Springfield, Ohio, which contains magnesia in quantity sufficient to make it a magnesian lime, and is almost chemically pure; but other dolomite or limestones which contain but small portions of silica or alumina will answer the purpose. The dolomite or limestone is calcined preferably at a low heat—that is, below redness—after which it is slaked or hydrated with water and brought to the same fineness as given for the oxide of iron. The oxide of iron and the lime or magnesian lime prepared in the manner above set forth are mixed in the proportion of about ninety (90) parts oxide of iron and ten (10) parts lime or magnesian lime, by weight, and water is added in sufficient quantity to make the whole into a thick mortar. The lime or magnesian lime and oxide of iron may be mixed dry and water added, or the lime or magnesian lime and water may be mixed into a milk of lime or of magnesian lime and added to the oxide of iron, as preferred.

The compound may be used to line furnaces, converters, and other vessels in which metallurgic operations are carried on, and may, if preferred, be applied on the outside or over the basic or silicious lining, and protects the linings during the desiliconization of the metal. The compound may be applied wet or in a plastic condition, as mortar is applied, or it may be rammed on the hearth of a furnace, or it may be rammed about a core, so as to be packed to the sides of the vessel and the core afterward withdrawn. When dried the lining is ready for use. The compound may be made into brick and dried in the atmosphere, when they are ready for use.

Linings and brick made of this compound are especially adapted for lining furnaces in which crude iron is puddled or purified, and where the temperature is about as high as those of a puddling-furnace. The lining being highly refractory at those temperatures, a portion of the lining made of this compound becomes incorporated into the charge and a portion becomes a reagent and unites with the slag. The brick when exposed in an atmosphere of carbonic oxide and not used as a lining becomes converted to metallic sponge, which, in contact with melted iron, becomes a part of the charge of melted iron.

I do not wish to be understood as claiming the use of an iron sponge in combination with melted crude iron, as this has been before added to melted crude iron.

I am aware that magnetic oxide of iron containing titanic acid has been heretofore used as a lining, and do not claim the use of oxide of iron in lumps, either alone or when mixed with graphite and fire-clay.

What I claim as new, and desire to secure by Letters Patent, is—

The compound for furnace-linings and fire-brick, consisting of oxide of iron, ninety parts; lime or magnesian lime, ten parts, and water, as specified and set forth.

JAMES HENDERSON.

Witnesses:
G. G. FRELINGHUYSEN,
W. L. BENNEM.